Sept. 21, 1971     J. E. BAYHA     3,606,941

DOCUMENT VALIDATION APPARATUS

Filed July 11, 1969     2 Sheets-Sheet 1

INVENTOR
JACK E. BAYHA
BY
*Oldham & Oldham*
ATTORNEYS

Sept. 21, 1971 J. E. BAYHA 3,606,941
DOCUMENT VALIDATION APPARATUS
Filed July 11, 1969 2 Sheets-Sheet 2
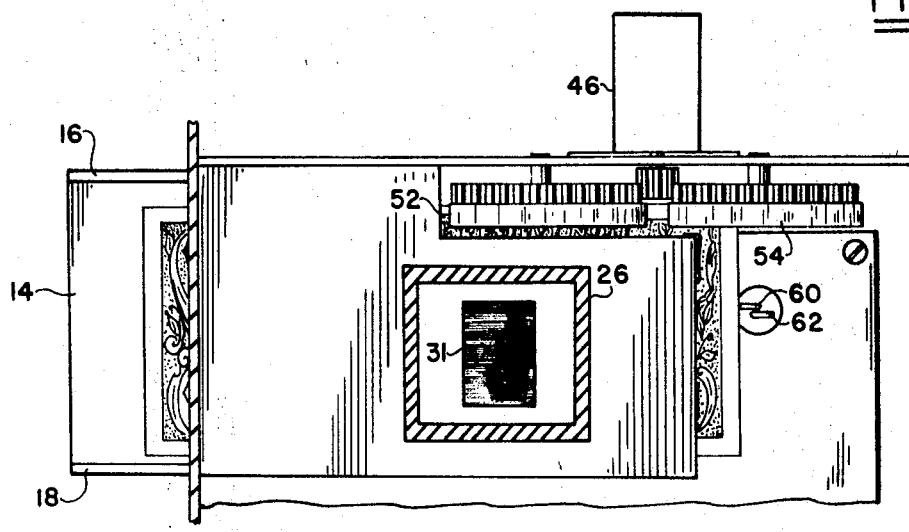
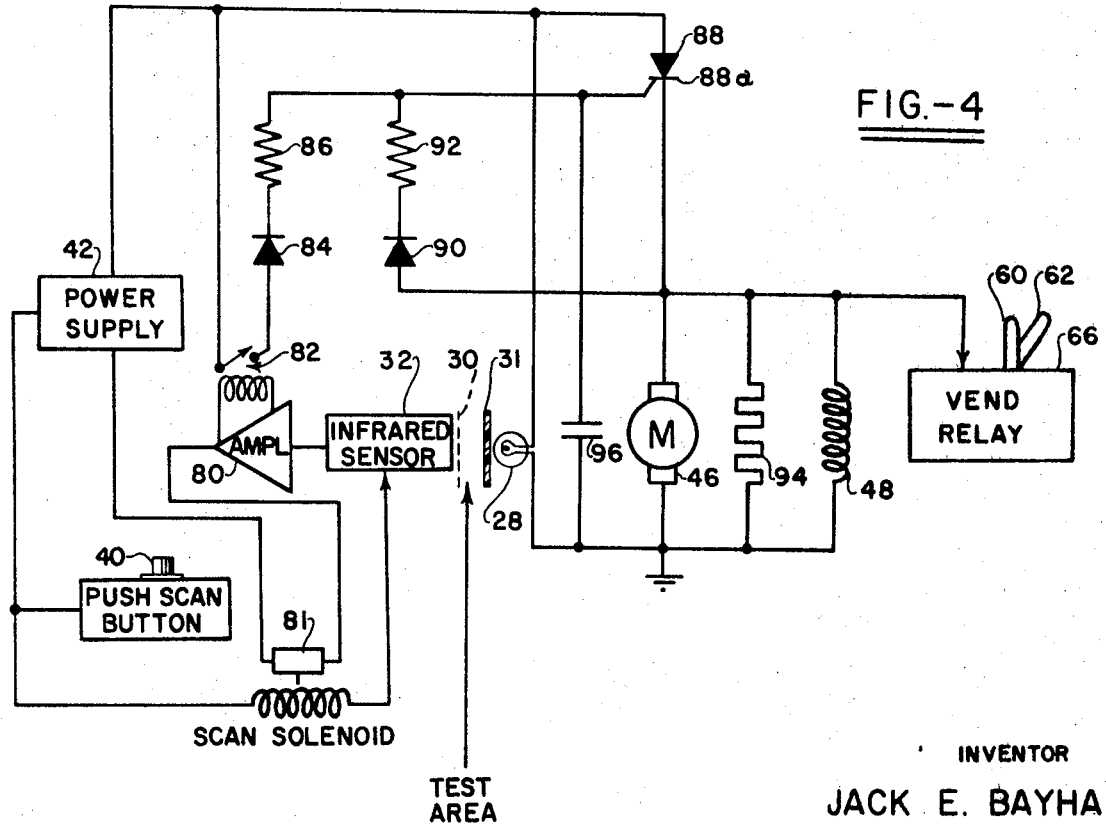
INVENTOR
JACK E. BAYHA
BY
Oldham & Oldham
ATTORNEYS United States Patent Office 3,606,941
Patented Sept. 21, 1971

3,606,941
DOCUMENT VALIDATION APPARATUS
Jack E. Bayha, Chesterland, Ohio, assignor to
Transmarine Corporation, Chesterland, Ohio
Filed July 11, 1969, Ser. No. 841,007
Int. Cl. G07f 1/06
U.S. Cl. 194—4
4 Claims

ABSTRACT OF THE DISCLOSURE

The invention relates to a slot-type document validation apparatus. The invention is characterized by having the document manually positioned into a testing area without the use of any trays, belts, or the like. Validation is accomplished by known techniques, and the document is then removed from the testing area upon proper validation with a positive removal system that eliminates the possibility of the document being removed from the testing area by any way other than the positive removal system, so that if the document is manually or otherwise restrained, the removal system will automatically reject the document and cancel the validation.

---

Heretofore, it has been known that there have been many and various types of document validation apparatus, and particular attention is called to my own Patents Nos. 3,419,724, 3,436,552, and 3,360,653. However, all prior art patents have required some type of tray or other positive transporting means to automatically position the document in a testing area so that when validation is accomplished, removal of the document is insured without having anyone manually or otherwise restrain the document or remove it so as to cause an authorized payout of the apparatus. The problem of providing an extremely simple means to position a document manually into a testing area and to remove it from the testing area when validation has been accomplished, which system will be inexpensive, highly reliable, and efficient is needed by the art.

Therefore, it is the general object of the invention to provide a document validation apparatus which is extremely inexpensive, highly reliable, and which utilizes a manual positioning of the document into the testing area and a positive removal system therefrom when validation has been properly accomplished and verified.

A further object of the invention is to provide an apparatus for document validation which utilizes a slot in the face of the apparatus with a slide associated with the slot so the document can be slidably positioned through the slot onto the slide into the document testing area while a portion of the document is still exposed and can be seen so the individual using the validator can insure that the document is properly positioned for testing.

A further object of the invention is to provide a slot with a slide where the slide is slanted with respect to the slot so that it is impossible to actually see what type of testing or where the testing takes place within the testing area of the validator.

The aforesaid objects of the invention and other objects which will become apparent as the description proceeds are achieved by providing a document validation apparatus which comprises a frame defining a document testing area and providing access to position a document to be tested into such area, means to conduct a document authentication test on any document positioned in such area and produce a signal thereof, and means to remove the document from the area upon receipt of an authentication signal, said means being sensitive to the mobility of the document in the testing area and rejecting the document if the mobility thereof is restrained in any way.

For a better understanding of the invention reference should be had to the accompanying drawings wherein FIG. 1 is a partial schematic block diagram side cross sectional view of validation apparatus comprising the preferred embodiment of the invention;

FIG. 3 is a top plan view in partial cross section of the apparatus of FIG. 1; and FIG. 4 is a schematic wiring diagram of the motor control circuit associated with the device of FIG. 1.

Figure 1:
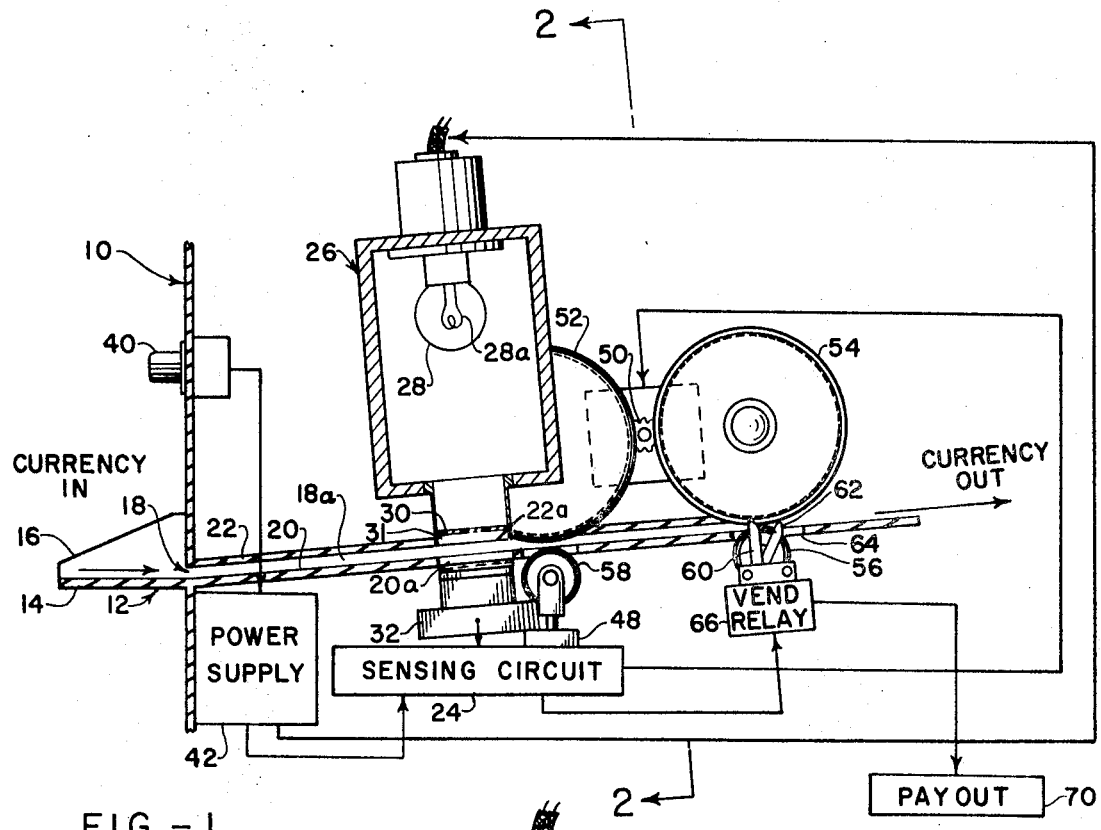

With reference to the embodiment of the invention illustrated in FIG. 1 of the drawings, the numeral 10 indicates generally a frame which encompasses and supports the apparatus comprising the validator. The frame defines a slide indicated generally by numeral 12 which comprises an external portion 14 having vertical tapered sides 16 and 18. The currency or document to be validated is slidably positioned onto the portion 14 of the slide 12 and then is pushed through a slot 18 in the face of frame 10 onto a rearward plate portion 20 of slide 12. The invention also contemplates that an upper retaining plate 22 will define a narrow, flat encompassing passage 18a that cooperates with slot 18 to position the document into the testing area of the apparatus.

The testing area of the apparatus is defined by a hole 20a in plate 20 and a corresponding hole 22a in plate 22. The holes 20a and 22a cooperate with a validation system comprising generally a sensing circuit 24 and a radiation source 26. The circuit 24 and source 26 are designed to cooperate to achieve a validation in substantially the same manner as defined in my above-identified Patent Number 3,457,421. Essentially, to this end, an infra-red radiation source 28 projects infra-red radiation through a reticle 30 carried by the sensing circuit 24 and positioned closely adjacent the document and all transmitted energy is detected by appropriate infra-red sensor 32 carried in the sensing circuit 24. A translucent filter 31 positioned between the reticle 30 and the radiation source eliminates noise from the filament 28a of source 28 and greatly improves the signal to noise ratio of the circuit 24.

However, it should be understood that any type of document validation system could cooperate to achieve the objects of the invention. The reason for showing the system illustrated in the drawings is that this is believed to be the optimum type of validation system presently available within the state of the art.

Figure 2:
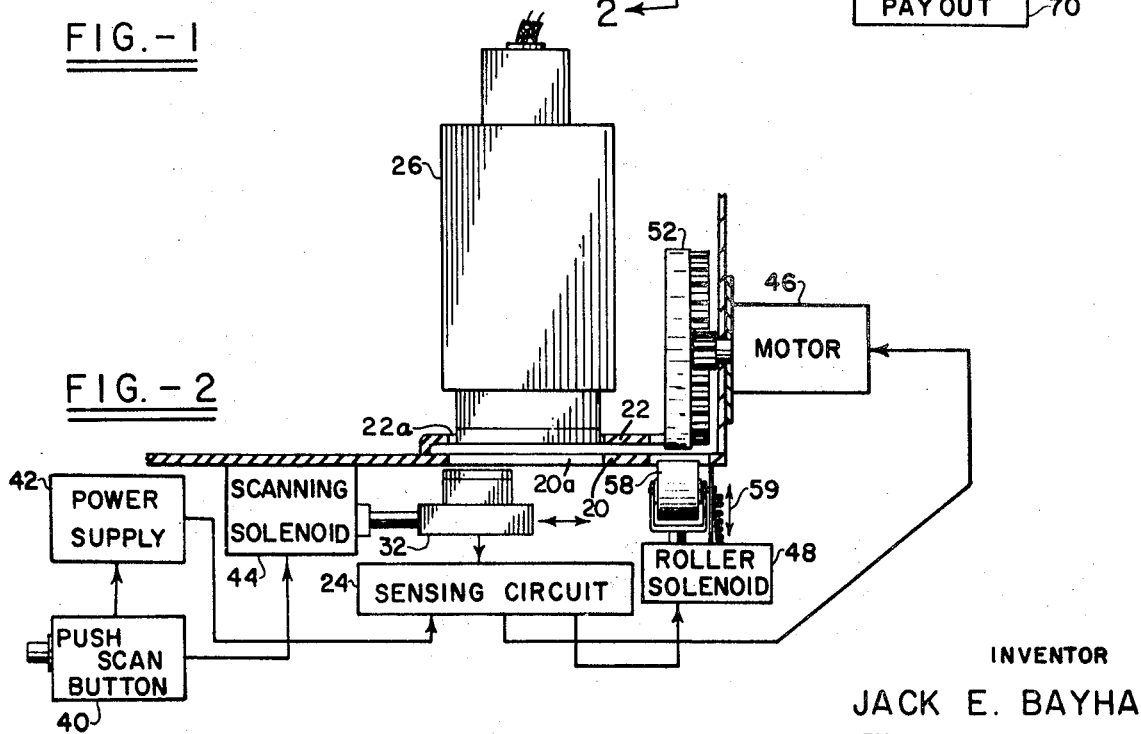
FIG. 2 is an end cross sectional view of the apparatus of FIG. 1 taken on line 2—2 thereof.

In an actual practice of the invention, an actuate button 40 is positioned on the frame 10 substantially directly above the tray 12 and pressing of this button initiates a power supply 42 which in turn provides power to the sensing circuit 24 and to the radiation source 26, as is clearly illustrated in FIGS. 1 and 2. The pushing of button 40 actuates a scanning solenoid 44 which drives the sensor 32 in a scan path across the openings 22a and 20a, as is quite clearly illustrated in FIG. 2. This scanning accomplishes a validation as described in my above-identified patent by in effect counting the number and spacing of lines in the portrait background section of a United States one dollar bill, for example, while simultaneously measuring the density of the ink in the bill. The scanning solenoid 44 is of the type that is spring loaded so that the sensor 32 returns to its initial position upon the completion of the scanning pulse and actuation of solenoid 44.

If the sensing circuit 24 generates an authentication signal, it actuates a motor 46 and roller solenoid 48 simultaneously. The motor 46 drives a small gear 50 which is appropriately centered in a gear train with large rolls 52 and 54 having rubber surfaces for engaging and driving the document out of slide 12. Roll 54 cooperates with a small idler roller 56 and is constantly in engagement therewith. The bill is actually fed into the bite between rolls 54 and 56 by movement of solenoid roller 58 into engagement with its respective roll 52 upon actuation of the roller solenoid 48. Generally, the invention contemplates that the solenoid roller 58 is the same type of idler roller as roller 56. The roller solenoid 48 is normally held in the deactuated position by a spring 59 quite clearly shown in FIG. 2.

As defined above, the scanning solenoid 44 is actuated by the scanning button 40, but this will only occur if a microswitch 60 has been engaged and actuated by a document to be tested actually positioned onto slide 12. The switch 60 is positioned so that it is appropriately engaged by the end of the document when it is slidably and manually positioned onto slide 12. A second microswitch 62 positioned adjacent switch 60, and extending up through a hole 64 in plate 20 cooperates with a vend relay 66 to give an indication that the document has moved completely past the switch 62 before a signal from relay 66 is sent to indicate payout 70. The microswitch 62 is so connected that it must go on and then off again before relay 66 is actuated to indicate payout. This provides a positive clearance feature of the apparatus to insure that payout never takes place until the document has been completely cleared.

It should be noted that the plate 20 of slide 12 is slanted or angled with respect to the exposed portion 14 so that anyone looking into the slide cannot see far enough to determine what happens to the document within the apparatus. An angles of perhaps 5° to 10° does not interfere at all with the slidable positioning of the document into the testing area.

As one extremely important feature, the invention contemplates that the motor 46 in combination with the power supply 42 will be extremely sensitive to the mobility of the document in the slide. Hence, any attempt to hold the document and prevent the rollers from grabbing it and removing it from the slide as described above, will cause an immediate stalling of the motor and a cancellation of the vend signal from circuit 24 through relay 66 to payout 70. The object of this very desirable feature, of course, is to prevent compromising of the apparatus by simply manually holding onto the end portion of the document as it is positioned into the tray for validation. This feature of the invention prevents jackpotting or unauthorized payouts by the apparatus.

The circuit to accomplish this aspect of the invention is illustrated in FIG. 4 of the drawings as a schematic wiring diagram. The circuit comprises an amplifier 80 cooperating with the power supply 42 through a switch 81 actuated by the scan solenoid 44 to amplify the signals detected by sensor 32 for actuation of a solenoid switch indicated generally by numeral 82. The switch 81 allows amplification to achieve validation only during the period of scan by sensor 32. The solenoid switch 82 is connected through a diode 84 and resistor 86 to supply power to effect turn on of a silicon controlled rectifier 88. The rectifier 88 directly actuates the motor 46. A feedback is provided by diode 90 in combination with resistor 92 to effect shutdown of rectifier 88 if the drag on motor 46 reaches a predetermined amount. The sensitivity of the feedback is controlled by the value of resistor 92. Also, the type of motor utilized is critical as the motor must make noise, or in effect be electrically noisy. I have found that a carbon brush motor with two or more brushes that makes commutator noise in its operation is best suited for this purpose. A typical motor found capable of achieving the objects of the invention is one made by the Mabuchi Company, and identified as No. FT-36D-18200.

The diodes 84 and 90 provide a more positive and stable turn on of the silicon rectifier 88. A thermal heater 94 for motor burn out protection, and roller solenoid 48 are mounted in parallel with the motor 46. The signal on the drive side of the motor 46 also is fed to the vend relay 66, and hence this relay 66 is strictly controlled by the presence of a signal. Therefore, it can be understood that stalling of motor 46 will automatically prevent operation of the relay 66.

The motor circuit operates as follows:

Noise from motor 46 is passed to the gate 88a of SCR 88 via diode 90 and resistor 92. This noise keeps capacitor 96 charged, which keeps a signal on the gate 88a of the SCR 88. If the motor is stalled, the brush noise is no longer present, and the energy in capacitor 96 dissipates into gate 88a, and in the lack of gate signal, the SCR 88 shuts down. The signal which turned the SCR on, was received from the pulse of power via relay contact 82, diode 84 and resistor 86. This signal or pulse has been shut off since the scan has stopped. Hence, if a valid document is present, the scan is adapted to only generate enough energy to enable the motor 46 to get started running. After the scan signal is completed, the motor 46 then runs only on what it gets from the brushes' noise. Also, if you stall the motor, the brush noise disappears and the motor stops.

Hence, it can be seen that the objects of the invention are achieved by a conventional authentication system in combination with a slide and an extremely sensitive document removal apparatus. It should be understood that in some instances a push-button scan may not be desirable, and in this instance, actuation may be by initiation through switch 60 indicating the presence of a bill or document to be validated. It is also desirable that the system be non-frequency responsive since scan speed is not critical and need not be uniform, and hence to this end, the amplifier 80 will preferably have frequency reception characteristics over a broad range from essentially zero to 5,000 hertz.

While in accordance with the patent statutes, only one best known embodiment of the invention has been illustrated and described in detail, it is to be particularly understood that the invention is not limited thereto or thereby, but that the inventive scope is defined in the appended claims.

What is claimed is:

1. A document validation apparatus, comprising:
  a frame defining a document testing area and providing access to position a document to be tested into such area;
  means to conduct a document authentication test on any document positioned in such area and to produce a signal thereof;
  motor driven means to engage and remove the document from the test area upon receipt of the authentication signal; and
  control means operative to cancel the authentication signal and stop the motor upon a decrease in motor speed due to any restraint of the mobility of the document.

2. Apparatus according to claim 1 wherein the means to conduct a document authentication test comprises a radiation source positioned on one side of the document, a radiation sensitive sensor positioned on the opposite side of the document, a reticle positioned between the source and the sensor and having a lined portion substantially complementary to a portion of the document adjacent thereto when in the test area, means to move the document and reticle relative to each other while simultaneously sensing the amount of radiation received by the sensor and producing a signal thereof, an amplifier receiving the signal from the sensor, and switch means actuated by the relative movement between the reticle and the document to actuate the amplifier only during the period of relative movement therebetween.

3. Document validation apparatus according to claim 1 wherein the control means comprises an electrical gate between the motor and the authentication signal source, an electrical feedback circuit from the motor to the gate, and electrical power means on the other side of the gate, said gate being turned on by the authentication signal and remaining on so long as feedback from the motor is present.

4. Apparatus according to claim 3 where the motor is a carbon brush motor, and where the brushes make noise to provide a good signal over the feedback circuit to the gate.

References Cited

UNITED STATES PATENTS

| | | |
|---|---|---|
| 2,635,746 | 4/1953 | Gordon. |
| 2,951,164 | 8/1960 | Timms. |
| 3,090,485 | 5/1963 | Moore _____ 194—4X |
| 3,246,297 | 4/1966 | Silverstein et al. ____ 250—219X |
| 3,419,724 | 12/1968 | Bayha _____ 194—4X |
| 3,442,363 | 5/1969 | Riddle et al. _____ 194—4 |
| 3,443,107 | 5/1969 | Modglin _____ 194—4X |
| 3,457,421 | 7/1969 | Bayha _____ 250—219 |
| 3,485,358 | 12/1969 | Hooker _____ 250—219X |

ROBERT B. REEVES, Primary Examiner

D. A. SCHERBEL, Assistant Examiner

U.S. Cl. X.R.

250—219